United States Patent
Shei

(10) Patent No.: US 11,844,464 B2
(45) Date of Patent: Dec. 19, 2023

(54) CONTACT TOASTER

(71) Applicant: Marmon Foodservice Technologies, Inc., Osseo, MN (US)

(72) Inventor: Steven Shei, Osseo, IN (US)

(73) Assignee: Marmon Foodservice Technologies, Inc., Osseo, MN (US)

(*) Notice: Subject to any disclaimer, the term of this patent is extended or adjusted under 35 U.S.C. 154(b) by 66 days.

(21) Appl. No.: 17/495,197

(22) Filed: Oct. 6, 2021

(65) Prior Publication Data

US 2022/0104658 A1 Apr. 7, 2022

Related U.S. Application Data

(60) Provisional application No. 63/088,734, filed on Oct. 7, 2020.

(51) Int. Cl.
*A47J 37/08* (2006.01)
*A23L 5/10* (2016.01)

(52) U.S. Cl.
CPC ............. *A47J 37/0814* (2013.01); *A23L 5/15* (2016.08); *A47J 37/0871* (2013.01)

(58) Field of Classification Search
CPC ...... A47J 37/08; A47J 37/0814; A47J 37/085; A47J 37/0857; A47J 37/0864; A47J 37/0871; A23L 5/15
See application file for complete search history.

(56) References Cited

U.S. PATENT DOCUMENTS

| | | | |
|---|---|---|---|
| 2,865,280 A | 12/1958 | Lamatina | |
| 3,824,915 A | 7/1974 | Capucio | |
| 4,261,257 A * | 4/1981 | Henderson | A47J 37/044 99/349 |
| 4,530,276 A * | 7/1985 | Miller | A47J 37/044 99/393 |
| 5,549,040 A | 8/1996 | Naramura | |
| 5,673,610 A * | 10/1997 | Stuck | A47J 37/0864 99/393 |
| 5,960,704 A * | 10/1999 | March | A47J 37/0864 99/372 |
| 6,177,654 B1 * | 1/2001 | Schackmuth | A47J 37/0857 99/349 |
| 6,192,789 B1 * | 2/2001 | Agcaoili | A47J 37/0857 99/392 |
| 6,223,650 B1 * | 5/2001 | Stuck | A47J 37/0857 99/393 |
| 7,217,906 B2 | 5/2007 | Veltrop et al. | |

(Continued)

*Primary Examiner* — Hung D Nguyen
(74) *Attorney, Agent, or Firm* — Andrus Intellectual Property Law, LLP

(57) ABSTRACT

A contact toaster includes a vertically arranged central platen with a first toasting surface that is contoured and a second toasting surface. A heating element is configured to heat the first and second toasting surfaces. A first compression plate is spaced apart from the first toasting surface to define a first slot between the first compression plate and the first toasting surface. A second compression plate spaced apart from the second toasting surface to define a second slot between the second compression plate and the second toasting surface. The first compression plate and the second compression plate are selectively movable from respective first positions away from the central platen to respective second positions proximate to the central platen.

15 Claims, 11 Drawing Sheets

(56) References Cited

U.S. PATENT DOCUMENTS

| | | | |
|---|---|---|---|
| 7,285,755 B1 * | 10/2007 | Kingdon | A47J 37/0857 99/386 |
| 10,427,313 B2 | 10/2019 | Engel-Hall et al. | |
| 10,660,466 B2 | 5/2020 | Yazvin et al. | |
| 11,019,960 B1 | 6/2021 | Wilson et al. | |
| 2003/0051605 A1 * | 3/2003 | Frantz | A47J 37/0864 99/422 |
| 2012/0017774 A1 | 1/2012 | Martinez et al. | |
| 2016/0045068 A1 | 2/2016 | Sands et al. | |
| 2018/0125297 A1 | 5/2018 | Walker et al. | |
| 2020/0245808 A1 | 8/2020 | Yazvin et al. | |
| 2020/0375397 A1 | 12/2020 | Zhang | |

* cited by examiner

CONTACT TOASTER

CROSS-REFERENCE TO RELATED APPLICATION

The present application claims priority of U.S. Provisional Patent Application No. 63/088,734, filed on Oct. 7, 2020, the content of which is hereby incorporated by reference in its entirety.

BACKGROUND

The present disclosure is related to the field of toasters. More specifically, the present disclosure is related to toasters which are adjustable to accommodate toasting of a variety of food products.

In high volume cooking applications, conveyor toasters are commonly used for in-line toasting of food items. A conveyor toaster can include a heated toasting platen and a slowly rotating conveyor, which urges a food product against the platen while it simultaneously drags the food product across the platen's hot surface. By virtue of its design, a conveyor toaster is able to process food products consistently and continuously as opposed to the toasters commonly used by consumers, which process food products in a batch mode.

SUMMARY OF THE INVENTION

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

An example of contact toaster is configured to toast a food product having a first food product portion and a second food product portion. The contact toaster includes a central platen arranged vertically within the contact toaster. The central platen includes a first toasting surface and a second toasting surface generally opposite the first toasting surface. The first toasting surface is contoured. A heating element is configured to heat the first and second toasting surfaces. A first compression plate is spaced apart from the first toasting surface to define a first slot between the first compression plate and the first toasting surface. A second compression plate spaced apart from the second toasting surface to define a second slot between the second compression plate and the second toasting surface. The first compression plate and the second compression plate are selectively movable from respective first positions away from the central platen to respective second positions proximate to the central platen. The first toasting surface is shaped to conform to a surface of the first food product portion and the second toasting surface is shaped to conform to a surface of the second food product portion.

In examples of the contact toaster, the first compression plate is contoured complimentarily to the first toasting surface of the central platen. The first toasting surface may be convex and the first compression plate may be concave. The second compression plate is complementary to the second toasting surface. The second compression plate and the second toasting surface are planar. Guide wires are connected to a lower end of the central platen. The guide wires are configured to guide the first and second food product portions exiting the first and second slots through bottom ends thereof to a discharge slide leading to the discharge opening. A first gate is positioned below the first slot and a second gate is positioned below the second slot. The first and second gates are selectively movable between closed positions in which a bottom end of the first and second slots are blocked and open positions in which the first and second food product portions can move through the bottom ends of the first and second slots. The first gate is connected to the first compression plate and the second gate is connected to the second compression plate.

In other examples of the contact toaster, at least one additional heating element is configured to heat at least one of the first compression plate and the second compression plate. The central is selectively movable between a toasting position in which the central platen is positioned between the first and second compression plates and a cleaning position in which the central platen is out of alignment with the first and second compression plates. A first wiper and a second wiper are respectively configured to wipe the first toasting surface and the second toasting surface as the central platen moves between the toasting position and the cleaning position. A first gate and a second gate are movable between open positions and closed positions to selectively retain the first and second food product portions if the first and second slots. The first wiper is secured to the first gate and the second wiper is secured to the second gate and the central platen is selectively movable past the first and second wiper. The first wiper is configured to engage the first toasting surface and the second wiper is configured to engage the second toasting surface as the central platen moves past the first and second wiper. At least one nozzle is configured to spray a liquid onto the first and second toasting surfaces as the central platen moves between the toasting position and the cleaning position. The liquid may be water, oil, a cleaning solution, and a flavor enhancer.

A method for toasting a first food product and a second food product with a contact toaster that includes a contoured central platen, a first compression plate opposite a first toasting surface of the central platen defining a first slot therebetween, and a second compression plate opposite a second toasting surface of the central platen defining a first slot therebetween. The method includes receiving, via a feed opening of the contact toaster, the first food product into the first slot and the second food product into the second slot. The first and second toasting surfaces are heated by activating a heating element. The first and second compression plates are moved with a compression plate actuator towards the central platen from respective first positions to second positions to press the first food product against the first toasting surface and the second food product against the second toasting surface. The heating element is controlled to maintain a toasting temperature of the first and second toasting surfaces to toast a surface of the first and second food products. The first and second compression plates are retracted with the compression plate actuator from the second positions to the first positions to release the first and second food products from the first and second toasting surfaces.

The method may further include moving a first gate and a second gate from closed positions to open positions to release the toasted first and second food products from the first and second slots. The toasted first and food products are dispensed from the contact toaster via a discharge opening. The first and second food products into the first and second slots are received through top ends of the first and second slots. The first and second food products exit the first and second slots through bottom ends of the first and second slots. The heating element is deactivated after the first and second food products are dispensed from the first and second slots. A first compression is applied to the first food product by the first compression plate and the first toasting surface is measured with at least one force sensor and a second compression force is applied to the second food product by the second compression plate and the second toasting surface is measured with at least one force sensor. The first compression plate is moved towards the central platen until the first force exceeds a first threshold and moving the second compression plate towards the central platen until the second force exceeds a second threshold. Toasting parameters including at least one of a toasting time, a toasting temperature, and a compression force are received via the control interface. The central platen is moved from a toasting position to a cleaning position with a central platen actuator. Debris is wiped from the first toasting surface with a first wiper and debris is wiped from the second toasting surface with a second wiper as the central platen moves between the toasting position and the cleaning position. The central platen is moved with the central platen actuator from the cleaning position to the toasting position. A liquid is sprayed from a nozzle onto the first and second toasting surfaces as the central platen moves between the toasting position and the cleaning position. A self-cleaning process may be performed after a predetermined number of food items has been toasted.

Various other features, objects, and advantages will be made apparent from the following description taken together with the drawings.

DETAILED DISCLOSURE

Figure 1:
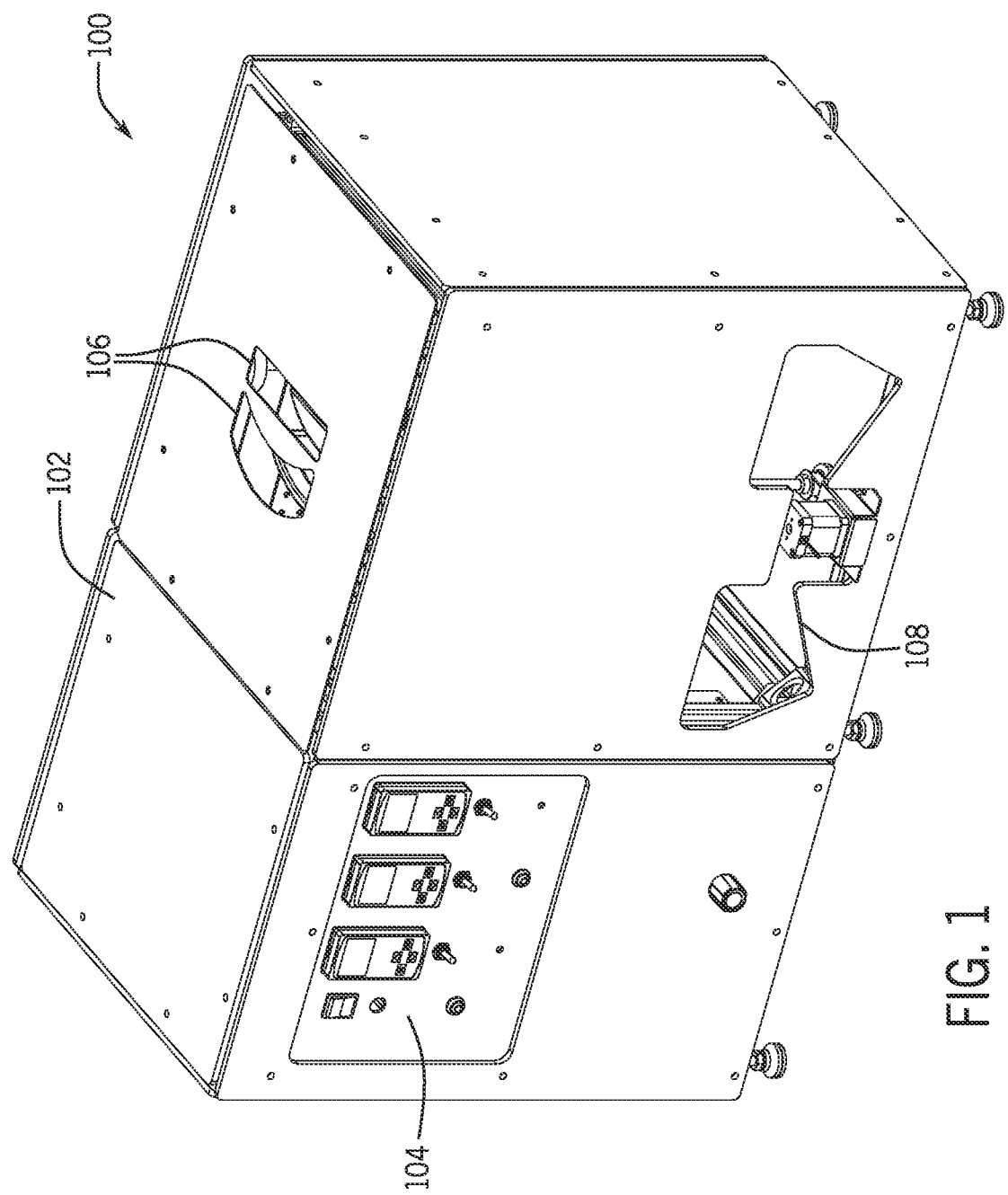
FIG. 1 is a perspective view of an example of a contact toaster.
Figure 2:
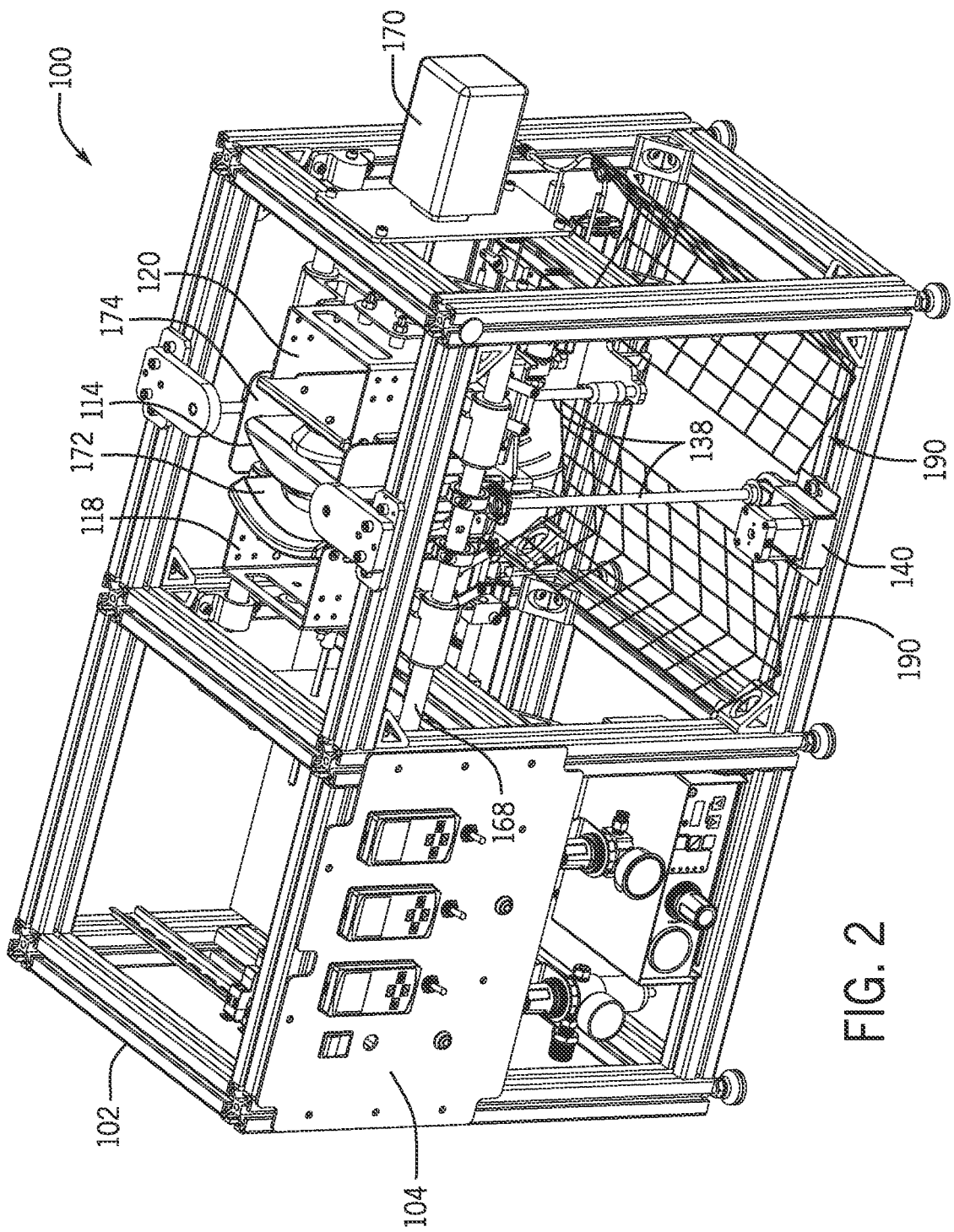
FIG. 2 is a perspective view of the contact toaster of FIG. 1 with the side panels removed.
Figure 3:
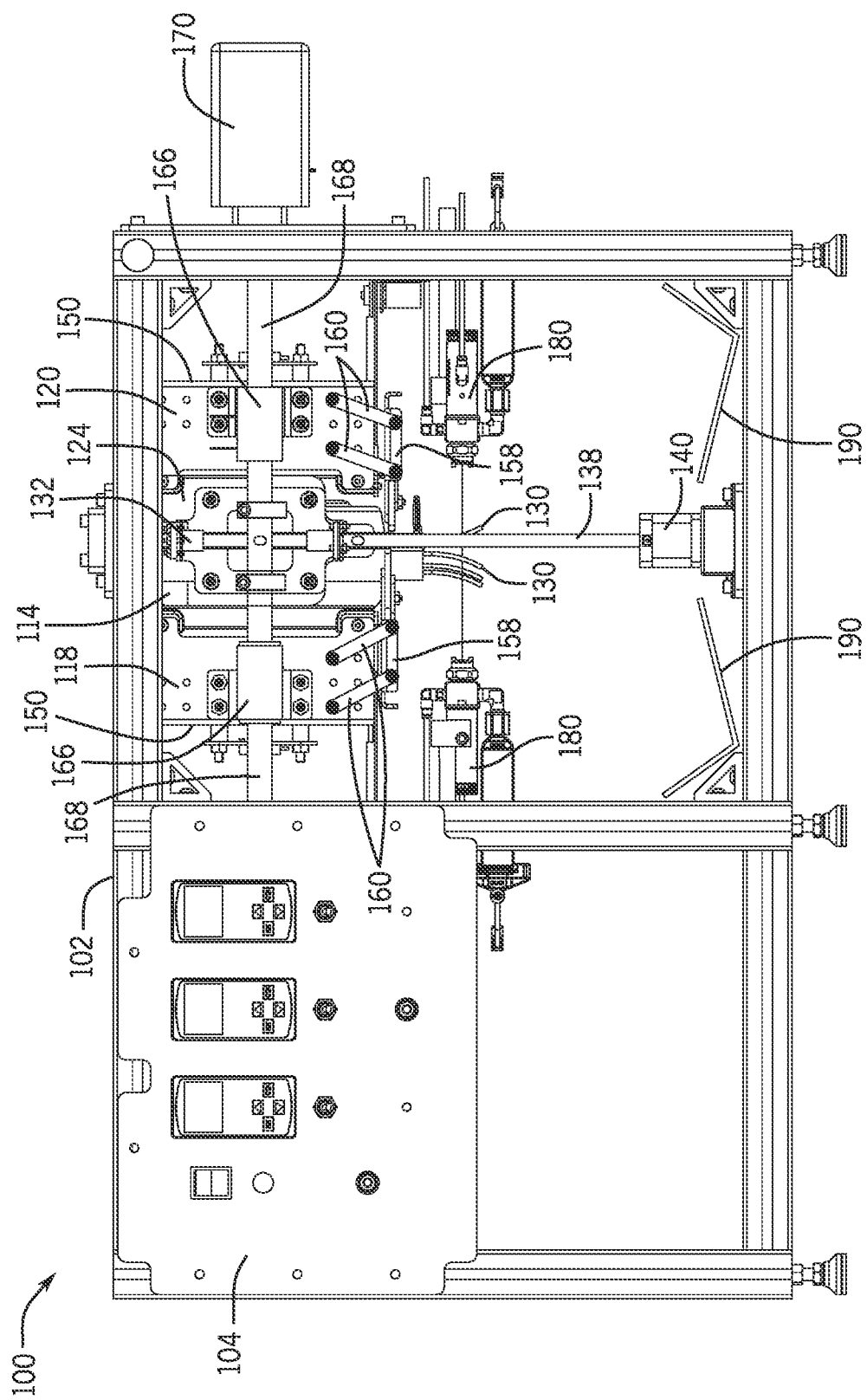
FIG. 3 is a front view of the contact toaster.

In the present description, certain terms have been used for brevity, clarity, and understanding. No unnecessary limitations are to be inferred therefrom beyond the requirement of the prior art because such terms are used for descriptive purposes only and are intended to be broadly construed. The different methods and assemblies described herein may be used alone.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "linked," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "bottom," "front," "back," "left" or "right" features is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally, use of the words "first," "second", "third," etc. is not intended to connote priority or importance, but merely to distinguish one of several similar elements or machines from another.

The terms "heat" and "heating" mean, to "make warm or hot". The term "heating food products" means to make food products warm or hot. The terms, heat, heating, and heating food products include heating a food product to a temperature at which the food product is toasted. As used herein, toast, toasted, and toasting all refer to heating a food product to make it crisp, hot, and/or brown by heat or heating.

It has been recognized by the present inventors that, while capable of consistent toasting, existing conveyor toasters can have high power requirements and may require large amounts of time to pre-heat the cooking platen to an operational temperature. Conveyor toasters may also deform or leave marks on soft food products like breads and bagels, such as buns, bagels, or bread, as the conveyor drags the food product across the platen. Conveyor toasters can also have a limited ability to toast products of varying sizes and thicknesses since the spacing or separation distance between the actual conveyor and the heated platen is often fixed or not easily adjusted. Further, conveyor toasters can be difficult to clean because the platen is generally difficult to access without disassembling the toaster.

Through research and experimentation in the relevant field, the present inventors have developed a contact toaster configured to toast a variety of food products of different shapes and sizes without deforming or damaging the food products. The contact toaster includes a toasting platen that can be quickly and efficiently heated, and the contact toaster further includes an automated cleaning process.

FIGS. 1-4 illustrate an embodiment of a contact toaster 100 capable of quickly and efficiently toasting food products of different shapes and sizes. The contact toaster 100 includes a central platen 116 positioned between two compression assemblies 118, 120. The central platen 116 includes two toasting surfaces 126, 128 facing generally opposite sides of the central platen 116. The central platen 116 receives electrical energization which is converted to heat energy, for example by passing through resistive wires, thereby heating the central platen 116. In examples as detailed further herein, the two toasting surfaces 126, 128 may be shaped differently from one another so as to better accommodate differently shaped pieces of baked goods, for example, the crown portion and the heel portion of a bun.

The compression assemblies 118, 120 respectively include compression plates 146, 148. The compression plates 146, 148 of the compression assemblies 118, 120 are spaced apart from the respective toasting surfaces 126, 128 of the central platen 116 so that a food product may be received in slots 172, 174 located between one of the compression assemblies 118, 120 and a corresponding toasting surface 126, 128 of the central platen 116. To toast the food products, the toasting surfaces 126, 128 can be heated, and the compression assemblies 118, 120 can move towards the central platen 116 to press the food products against one of the toasting surfaces 126, 128. Once the food products are toasted, the compression assemblies 118, 120 can move away from the central platen 116, and gates 158 positioned at the lower end of each slot 172, 174 can be retracted to discharge the toasted food product from the contact toaster 100. Because the food products are not moved across the central platen during the toasting process, the central platen may be smaller than a platen in a conveyor toaster. As a result, less energy may be required to heat the platen, and the preheating time may be shorter.

Embodiments of a contact toaster may include at least one of a platen and a compression assembly that are configured for toasting a specific food product. A contour of one or both of the toasting surface 126, 128 and the compression assembly 118, 120 may be shaped to conform to a shape of a particular food product. In the illustrated embodiments, for example, the contact toaster 100 includes a central platen 116 and compression assemblies 118, 120 configured for toasting the crown section 82 and heel section 84 of a bun. The shape of the toasting surfaces 126, 128 of the central platen 116 and the compression plates 146, 148 are shaped to conform the surfaces of the crown section 82 and heel section 84. This may be useful, for example, in order to prevent deformation of the food buns during the toasting process. Other embodiments of a contact toaster may be configured for toasting other food products.

Additionally or alternatively, different parameters of the toasting process may be adjustable. The illustrated contact toaster 100 may include a control interface 104 that includes at least one display and at least on input device. The control interface 104 is configured to receive a user input of at least one of a toasting temperature, a toasting time, a force used to press a food product against the toasting surfaces 126, 128 with the compression assemblies 118, 120, or other parameters as may be recognized from the disclosure herein. Adjustments to the toasting process may be based on predetermined settings and/or user-defined settings.

Some examples of a contact toaster as disclosed herein can be configured with self-cleaning features. In the illustrated embodiments, for example, the central platen 116 may be movable between a toasting position and a cleaning position. As the central platen 116 is moved between positions, wipers 162 (which may be connected to the compression assemblies 118, 120), as will be described in further detail herein, may be configured to rub against the central platen 116 to wipe debris from the toasting surfaces 126, 128. Additionally or alternatively, the contact toaster 100 may include a sprayer 180 configured with a nozzle to spray the toasting surfaces 126, 128 with a fluid to help prevent debris buildup and/or to add flavor to the food product as it is toasted.

The contact toaster 100 may include a housing 102 with a frame and at least one panel secured thereto. The control interface 104 may be secured to a front side of the housing 102 and can include at least one of a display (such as an LCD display, indicator light or any other display) and an input device (such as a button, switch, knob/dial, touch interface or any other input). At least one feed opening 106 is formed through the top side of the housing and is configured to receive food product into the contact toaster 100. At least one discharge opening 108 can be formed through a front side of the housing 102. At least one of the feed opening 106 and the discharge opening 108 may be bifurcated such as to provide two different toasting paths which may be configured and operated to simultaneously provide two different toasting operations, for example, the toasting the heel and the crown of the bun and/or a middle club portion of a bun. In some embodiments, however, the feed opening and/or the discharge opening may be configured as a single opening. Additionally or alternatively, at least one of a feed opening and a discharge opening may be positioned on a different side of the housing than those of the illustrated embodiments.

Figure 5:
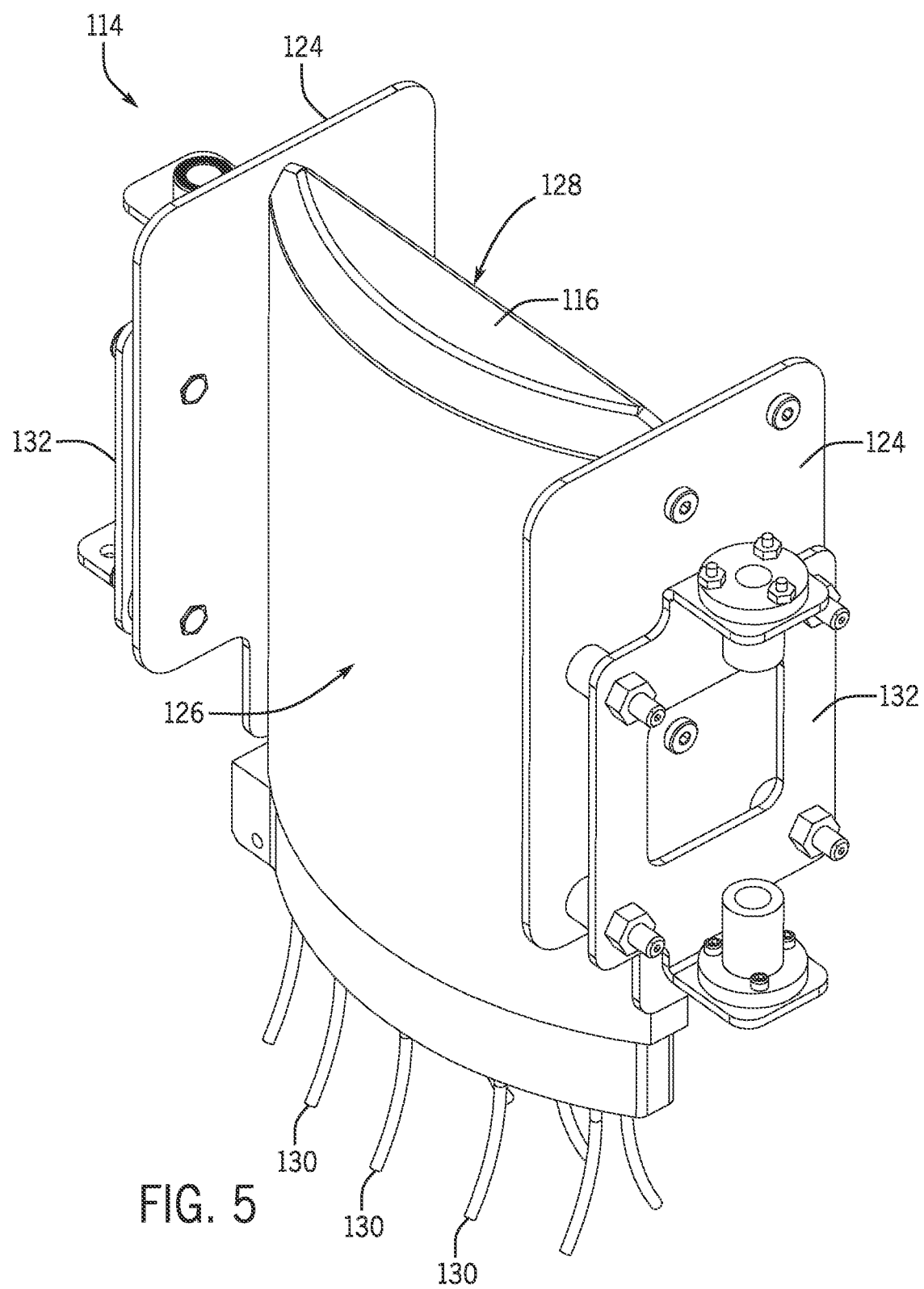
FIG. 5 is an isolated perspective view of a platen assembly.

A platen assembly 114 including the central platen 116 may be movably mounted to the frame of the housing 102. FIG. 5 is an isolated perspective view of the platen assembly 114. The central platen 116 includes a toasting surface 126 and a toasting surface 128 that face away from each other and extend between side plates 124 secured to opposite lateral sides of the central platen 116. To heat the toasting surfaces, at least one heating element 134 (See FIG. 8) is configured to heat the central platen. For example, a heating element 134 may be positioned in a cavity within the central platen 116 between the two toasting surfaces 126, 128. When powered, the heating element(s) 134 can be controlled to heat the toasting surfaces to an operational temperature. A plurality of guide wires 130 may be arranged on a bottom surface of the central platen 116 proximate the edges of the toasting surfaces 126, 128. Each of the guide wires can extend downward from the lower surface and outwardly away from the adjacent one of the toasting surfaces 126, 128. This may be useful as explained herein, for example, to guide toasted food product towards the discharge opening 108.

Figure 4:
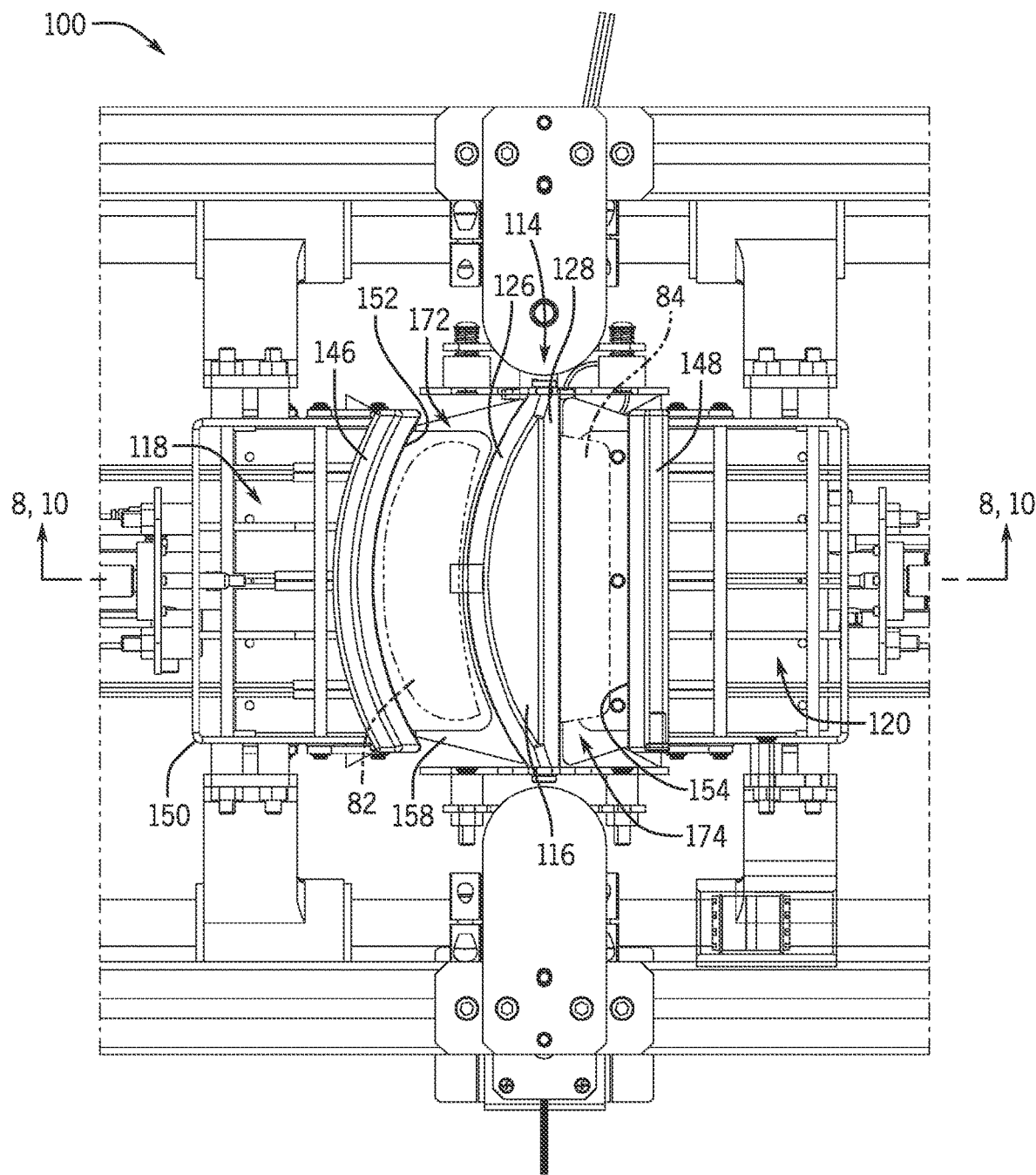
FIG. 4 is a top view of the contact toaster.

In some embodiments, the shape of at least one of the toasting surface and the toasting surface can conform to the geometry of the food product to be toasted. In the illustrated examples, the toasting surfaces 126, 128 can be configured for toasting the crown section 82 and the heel section 84 of a bun for example as shown in FIG. 4. The toasting surface 126 is convex and has an arc-shaped profile that thickens between the lateral sides of the central platen 116 and a midpoint between the lateral sides. The convex curvature of the toasting surface 126 may correspond to the concave cut surface of the crown section, which may be useful to help reduce deformation of the crown section. The toasting surface 128 may be substantially planar so that it corresponds to the flat cut surface of a heel section of a bun. In some embodiments of a contact toaster, however, at least one of the toasting surfaces may have a different shape or size than the illustrated toasting surfaces. For example, a platen can include toasting surfaces that are configured to correspond to the geometry of a different type of food product.

Additionally or alternatively, a contact toaster may include a symmetrical platen with two convex toasting surfaces with substantially the same shape.

To connect the platen assembly 114 to the housing, mounting features may be coupled to or integrally formed in at least one lateral side of the platen assembly 114. A mounting bracket 132 may be coupled to each of the side plates 124. Each mounting bracket 132 can include at least one hole configured to receive a vertical shaft or rail. The mounting brackets 132 are engaged by corresponding vertical support rods 138 that are positioned proximate the front and back of the housing 102 and each extend from a lower end proximate the bottom of the housing 102 and an upper end proximate the top of the housing 102. The mounting bracket 132 and the support rods 138 can be configured so that engagement therebetween permits vertical sliding movement of the platen assembly 114 between a toasting position and a cleaning position. When in the toasting position, the platen assembly 114 may be positioned proximate the top side of the housing 102 so that the central platen 116 is generally in alignment with the compression assemblies 118, 120. In the cleaning position, the platen assembly 114 can be positioned proximate a bottom side of the housing 102 so that the top end of the central platen 116 is positioned below the bottom of the compression assemblies 118, 120. In this position, the central platen 116 may be more easily accessible for manual cleaning.

Vertical movement of the platen assembly 114 may be controlled by an actuator system. In the illustrated embodiments, at least one of the vertical support rods 138 may be threaded, and the corresponding mounting bracket 132 can be configured to engage the threads of the vertical support rod 138. A central platen actuator 140 can be configured to selectively rotate the threaded vertical support rod 138 in either a first direction or a second direction. Engagement between the threads and the mounting bracket 132 may cause the platen assembly 114 to move downward when the threaded vertical support rod 138 is rotated in the first direction or upward when the threaded vertical support rod 138 is rotated in the second direction. Many alternative configurations for an actuator system will be recognized by one of ordinary skill in the art, and such configurations are intended to be within the scope of the present application.

Some embodiments of a contact toaster may be configured to move the central platen in a different direction from the toasting position to the cleaning position. For example, a central platen may be slidably mounted within the housing such that the central platen may move horizontally, and a central platen actuator may be configured to move the central platen laterally from the toasting position to a cleaning position in which the central platen is adjacent one of the side walls of the housing.

Figure 6:
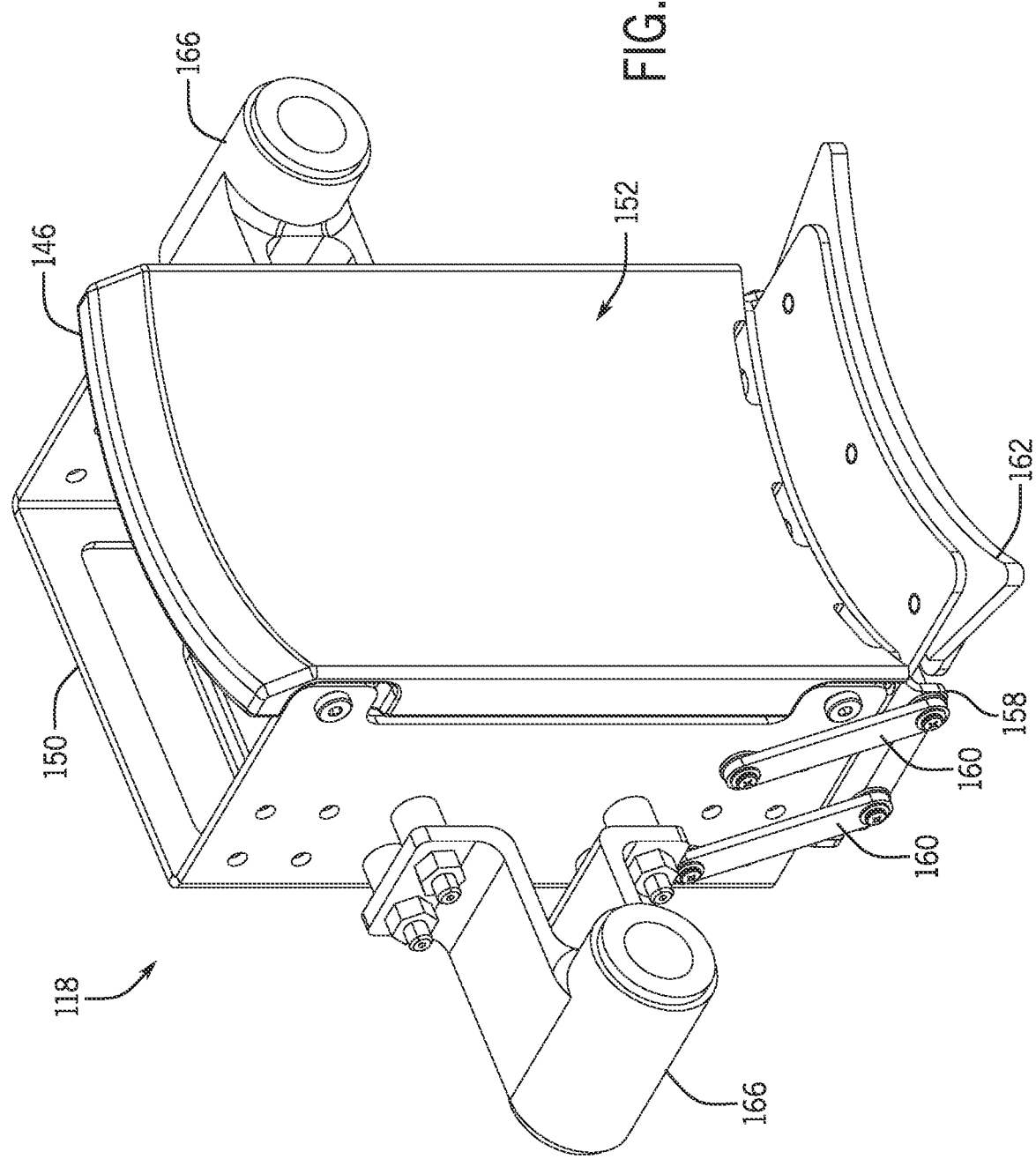
FIG. 6 is an isolated perspective view of a compression assembly.
Figure 7:
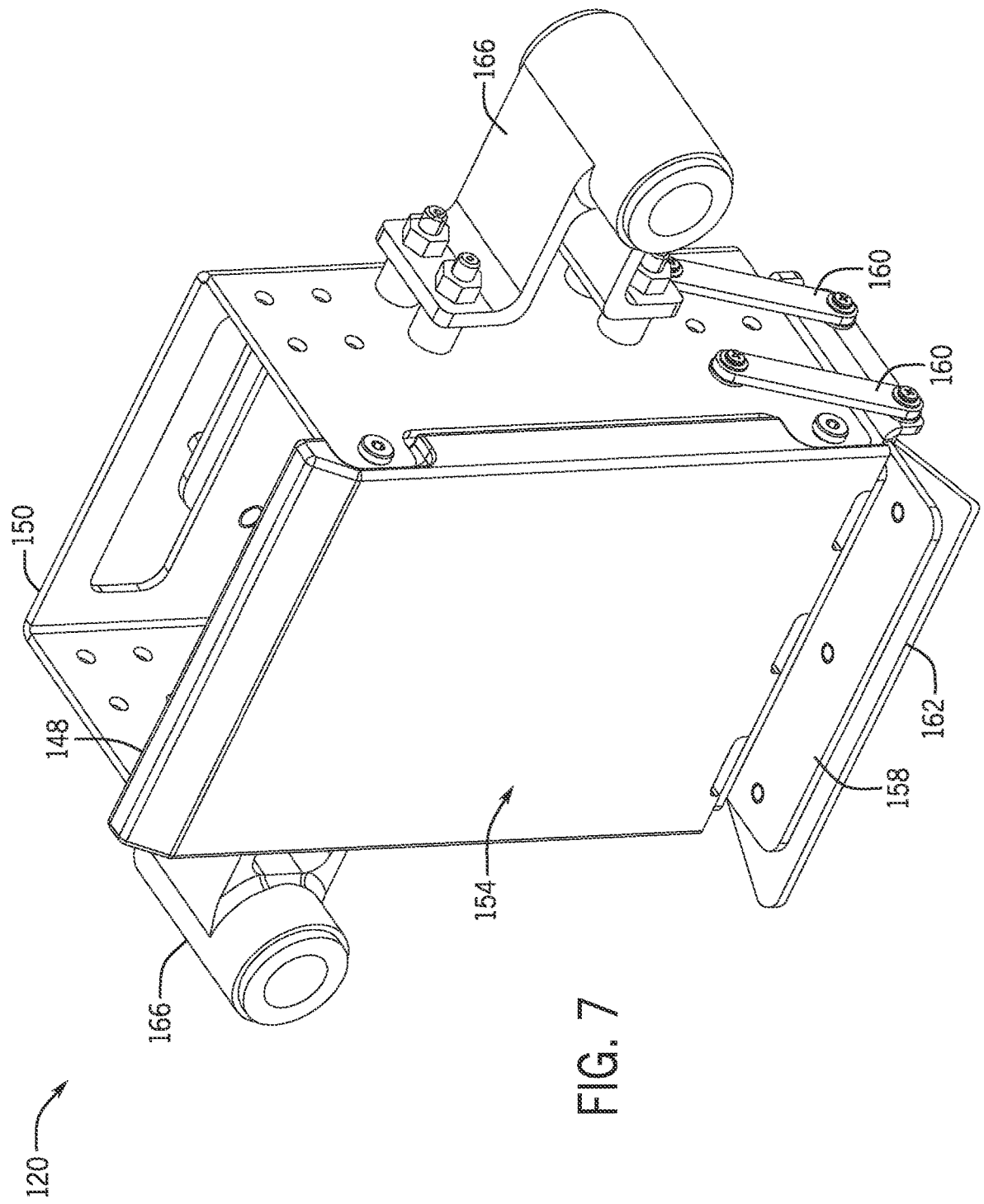
FIG. 7 is an isolated perspective view of a compression assembly.

The compression assemblies 118, 120 are shown in an isolated and perspective views in FIGS. 6 and 7. The compression assembly 118 includes a compression plate 146 secured between the lateral side walls of a generally U-shaped frame 150. A contact surface 152 of the compression plate 146 faces outwardly from the base wall of the U-shaped frame. The compression assembly 120 includes a compression plate 148 secured between lateral side walls of a generally U-shaped frame 150. A contact surface 154 of the compression plate 148 faces outwardly from the base wall of the U-shaped frame. The contact surfaces 152, 154 are configured to make contact with a food product and press it against the central platen 116. In some embodiments, the shape of the contact surfaces may be selected based on at least one of the geometry of the food product to be toasted, the shape of a corresponding toasting surface on the central platen, and any other factor. For example, as illustrated in FIG. 6, the compression plate 146 may have a concave contact surface 152 with an arc-shaped profile that curves inward towards the base wall of the U-shaped frame 150 from the lateral edges of the compression plate 146 towards a center of the compression plate 146. The curvature of the contact surface 152 may match the curvature of the toasting surface 126 of the central platen 116 and/or the geometry of the uncut side of the crown section of a bun. As illustrated in FIG. 7, the contact surface 154 of the compression plate 146 is substantially planar, matching the geometry of the toasting surface 128 of the central platen 116 and the uncut side of the heel section of a bun. In some embodiments, at least one of the compression plates 146, 148 may include a heating element 134 configured to selectively heat the contact surface 152, 154 to a desired temperature. The heating element 134 may be a resistive wire heating element positioned within the compression plate 146, 148 or may be conductively secured to a side of the compression plate 146, 148 opposite the respective contact surfaces 152, 154. This may be useful, for example, for heating or toasting the uncut and/or exterior surfaces of the crown and heel sections of a bun. Some embodiments, however, may include at least one compression plate without a heating element.

Embodiments of a compression assembly may include a movable gates 158 positioned below the bottom of the compression plates. The gate 158 may be movably secured to the bottom end of the frame 150 by a bar linkage 160. The bar linkage 160 can be configured to allow the gate 158 to selectively swing between a closed position and an open position. In the closed position, a portion of the gate 158 extends in front of a respective contact surface 152, 154 of the corresponding compression plate 146, 148. When moved to the open position, the gate 158 swings backward to position the gate 158 below the frame 150 and behind the contact surface 152, 154. The gate 158 may also be controlled to move to an intermediate position between the closed and open positions.

Examples of a compression assembly may include at least one wiper 162 configured to wipe a surface of the central platen. The compression assemblies 118, 120 include a wiper 162 extending from the front edge of at least one of the gate 158. A leading edge of a wiper 162 may be configured to correspond to at least one of the shape of a toasting surface of the platen and a contact surface of a compression plate. As shown in FIG. 6, the wiper 162 of the compression assembly 118 can have a curved leading edge that generally matches the shape of the toasting surface 126 and/or the compression surface 152. As illustrated in FIG. 7, the wiper 162 of the compression assembly 120 can have a straight leading edge that generally matches the planar shapes of the toasting surface 128 and/or the compression surface 154. In some embodiments, however, at least one compression assembly may include wiper that does not conform the corresponding toasting surface to which the wiper is configured to contact. Additionally or alternatively, a wiper may be positioned on at least one of the frame, the contact plate, and any other part of a compression assembly.

To connect the compression assemblies 118, 120 to the housing, one or more mounting members 166 are coupled to or integrally formed in at least one of the side walls of the frame 150. Each of the mounting members 166 is configured to receive a horizontal shaft or rail, for example through a horizontal hole through a portion of the mounting member 166. A pair of horizontal support rods 168 extend along the front and back of the housing 102 proximate the top side thereof. The mounting members 166 of the compression assembly 118 and the compression assembly 120 are engage these horizontal support rods 168. The mounting member 166 and the support rods 168 can be configured so that engagement therebetween permits horizontal sliding movement of the compression assemblies 118, 120 towards or away from the platen assembly 114. The compression assembly 118 and the compression assembly 120 may be selectively movable between an extended position, a retracted position, and an idle position between the extended and retracted positions. Movement of the compression assemblies can be controlled by linear actuators 170 coupled to the housing 102. Some embodiments, however, may be configured with a different mechanism for moving at least one of the compression assemblies.

When the compression assemblies are in the idle positions, a space dimensioned to receive a food product may be provided between each compression assembly and the platen assembly. For example, as illustrated in FIG. 4, a slot 172 is positioned between the contact surface 152 of the compression plate 146 and the toasting surface 126 of the central platen 116, and a slot 174 is positioned between the contact surface 154 compression plate 148 and the toasting surface 128. A crown section 82 of a bun is received within the slot 172 and a heel section 84 of a bun is received in the slot 174. However, it should be appreciated that embodiments of a contact toaster 100 can be configured to receive different types of food products in at least one of the slot 172 and the slot 174. The slots 172, 174 may generally be aligned with the two feed openings 106 formed through the top surface of the housing 102 and can be dimensioned to receive a food product entering the housing 102 through the corresponding feed opening 106 when the compression assemblies 118, 120 are in the idle position. The side plates 124 of the platen assembly 114 can define the sides of the slots 172, 174 and may restrict lateral movement of crown section 82 and heel section 84. Additionally, the gates 158 can be configured to extend across the bottom of the slots 172, 174 so that the leading edge of the wipers 162 is positioned proximate the bottom edge of the toasting surface 126, 128 when the gates 158 are in their closed positions. This may be useful, for example, to prevent food products from moving downward through the bottom of the slots 172, 174. When the gates 158 are moved into their open positions, the food products may be permitted to exit the slots 172, 174.

When moved into their extended positions, the compression assemblies 118, 120 may slide towards the platen assembly 114, thereby reducing the width of the slots 172, 174 (see, for example, FIG. 18). Optionally, gates 158 may swing into an intermediate position as the compression assemblies 118, 120 move towards the platen assembly 114 in order to maintain the position of the gates relative to the central platen 116. As the slot 172 and the slot 174 narrow, food products received in the slots 172, 174 may be pressed against the toasting surface 126 or the surface 128 by the compression plate 146 or the compression plate 148, respectively. In some embodiments, the compression force used to press a food product against a toasting surface may configurable. This may be useful, for example, in order to set a desired compression force for a specific type of food product. The compression force may be measured with force sensors that can be integrated into at least one of the compression plate 146, the compression plate 148, an actuator 170, and any other part of the compression assemblies 118, 120. In one example, the force sensor may measure a current drawn by the actuator to advance the compression assembly 118, 120 as an indication of the force applied between the movable compression plate 146, 148, and the central platen 116. As they are moved into their retracted positions, Movement of the compression assemblies 118, 120 towards the retracted positions increases a distance of the compression plates 146, 148 from the central platen 116. This increases the width of the slots 172, 174. Increasing the width of the slots 172, 174 after the food items have been compressed between the compression plates 146, 148 and the central platen 116 may facilitate toasted food product to separate from the toasting surfaces 126, 128.

As previously mentioned, embodiments of the contact toaster may include at least one sprayer 180 configured to spray the central platen 116 as the platen assembly 114 moves between the cleaning position and the toasting position. An isolated perspective view of an example of a sprayer 180 is provided in FIG. 11. The contact toaster 100 may include two sprayers 180 configured to spray a fluid onto the opposing toasting surfaces 126, 128 of the central platen 116. The sprayers 180 may be positioned below the compression assembly 118 and the compression assembly 120 and can be oriented so that a nozzle 182 of each sprayer 180 faces inward towards the opposite sprayer 180. The sprayers 180 may be arranged so that their nozzles 182 are generally in alignment with the top of the central platen 116 when the platen assembly is in the cleaning position. Thus, as the platen assembly 114 is moved between the toasting and cleaning positions, the sprayers 180 can spray fluid onto substantially the entirety of the toasting surfaces. The sprayer 180 exemplarily includes one or more pressure supply lines 186, which may be in the form of pressurized air or other gas. Additionally, the sprayer 180 is provided with one or more liquid supply lines 188 through which the substance to be sprayed, be it water, oil, cleaning solution, or otherwise is provided to the nozzle 182.

Figure 11:
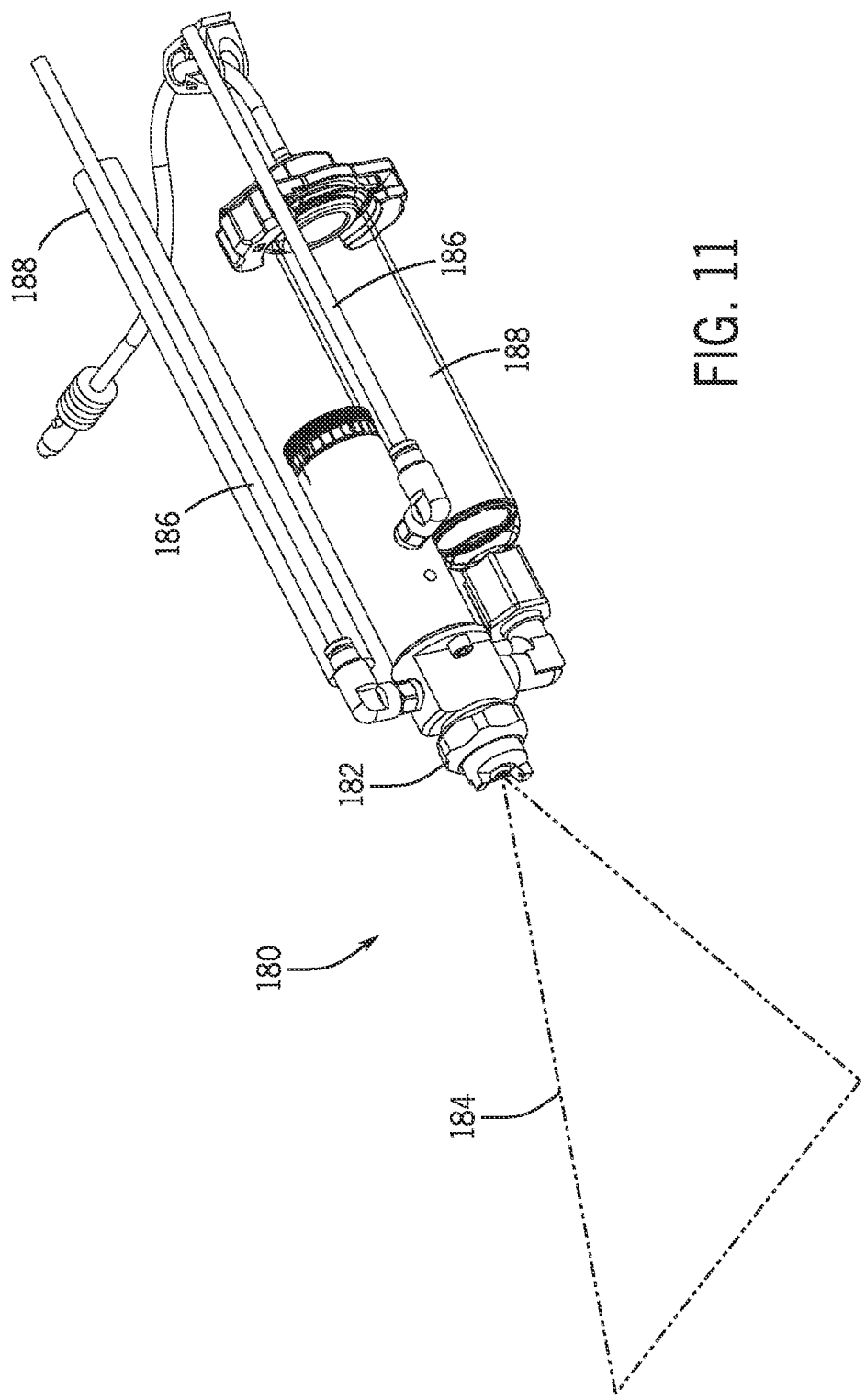
FIG. 11 is an isolated perspective view of a sprayer.

Embodiments of a contact toaster 100 can be configured to spray a variety of different fluids onto the toasting surfaces 126, 128 in order to clean the central platen and/or to impart flavor into a food product as it is toasted. For example, a sprayer 180 can be configured to spray at least one of water, oil, a cleaning solution, a flavor enhancer, and any other liquid onto the central platen 116. The nozzles 182 of the sprayers 180 may be configured to spray fluid into a spray pattern 184 across a distribution field that extends outward from the nozzle 182. In the illustrated embodiments, the spray pattern 184 of the sprayers 180 extends outward from the nozzle in a generally wedge-shaped pattern, for example as shown in FIG. 11. In some embodiments, however, at least one sprayer may be configured to spray fluid in a different pattern. For example, a sprayer may be configured with a cone-shaped distribution pattern, and/or a sprayer can be configured to spray fluid in a stream. In some embodiments, a contact toaster can include only one sprayer or more than two sprayers, and at least one of the sprayers may be secured to the housing in a different position and/or with a different orientation. Many alternative configurations for a contact toaster will be recognized by one of ordinary skill in the art, and such configurations are intended to be within the scope of the present application.

Figure 8:
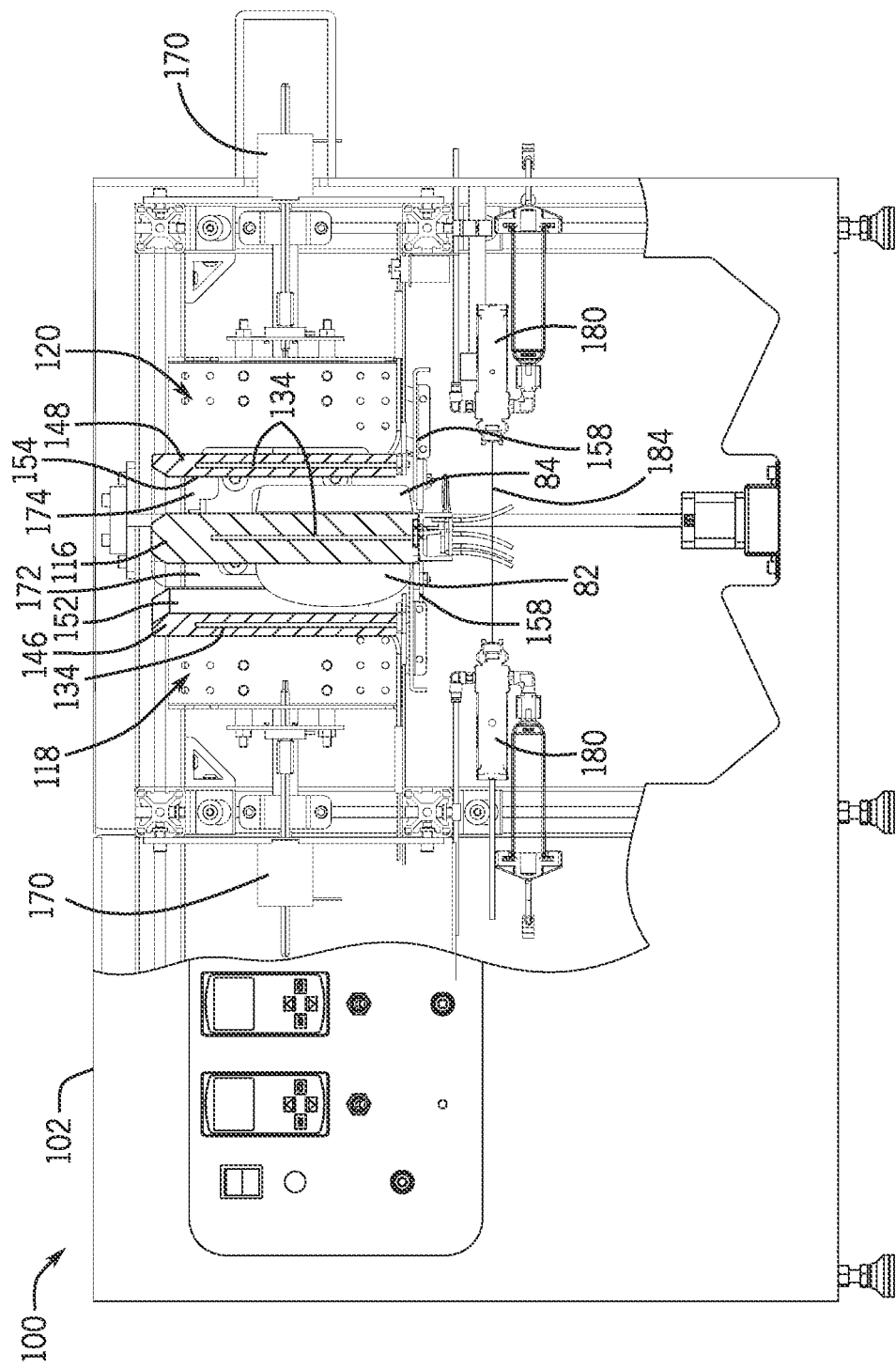
FIG. 8 is a front cross-sectional view of the contact toaster.
Figure 9:
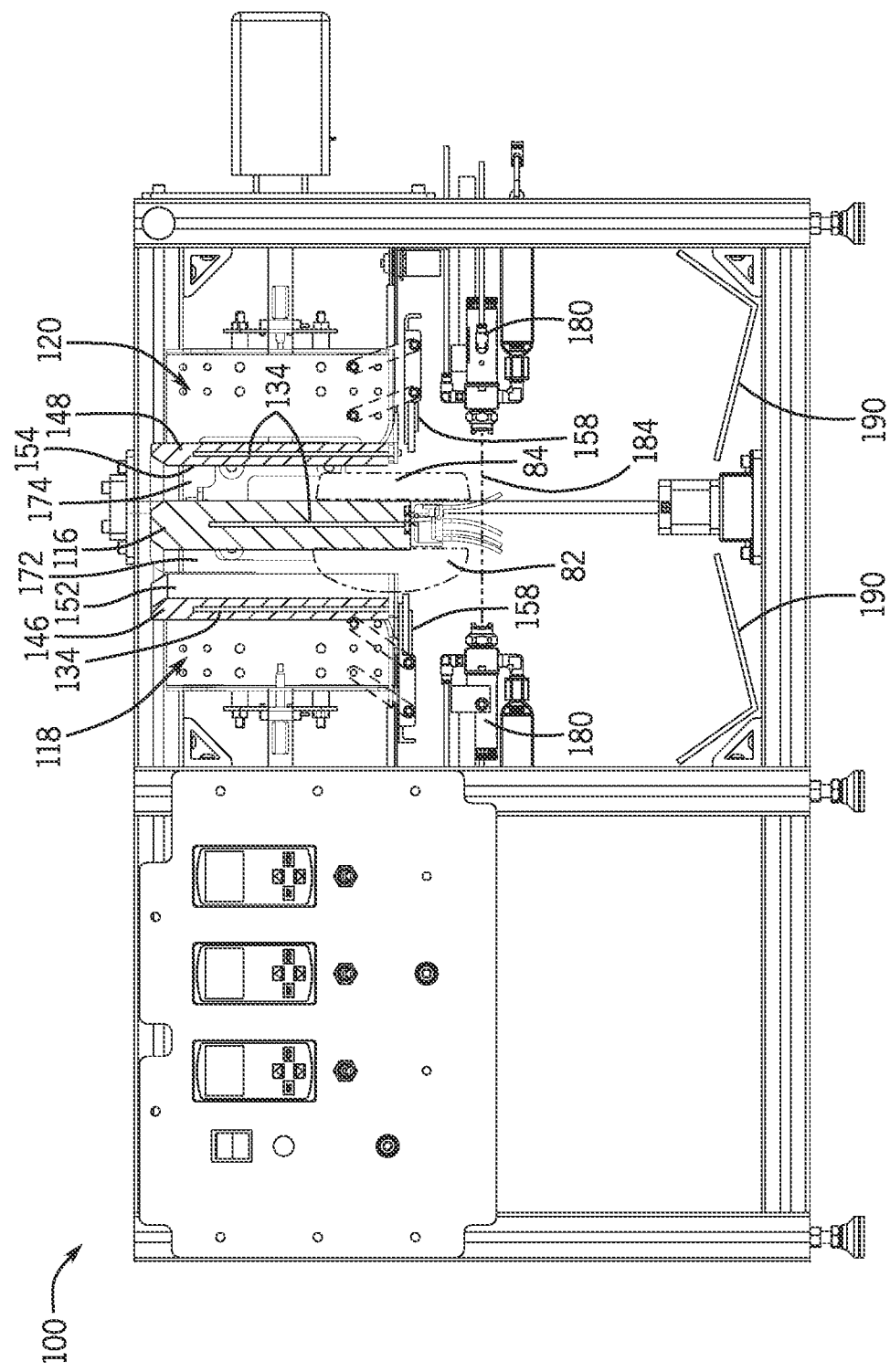
FIG. 9 is a front view of the contact toaster in an operational position.
Figure 10:
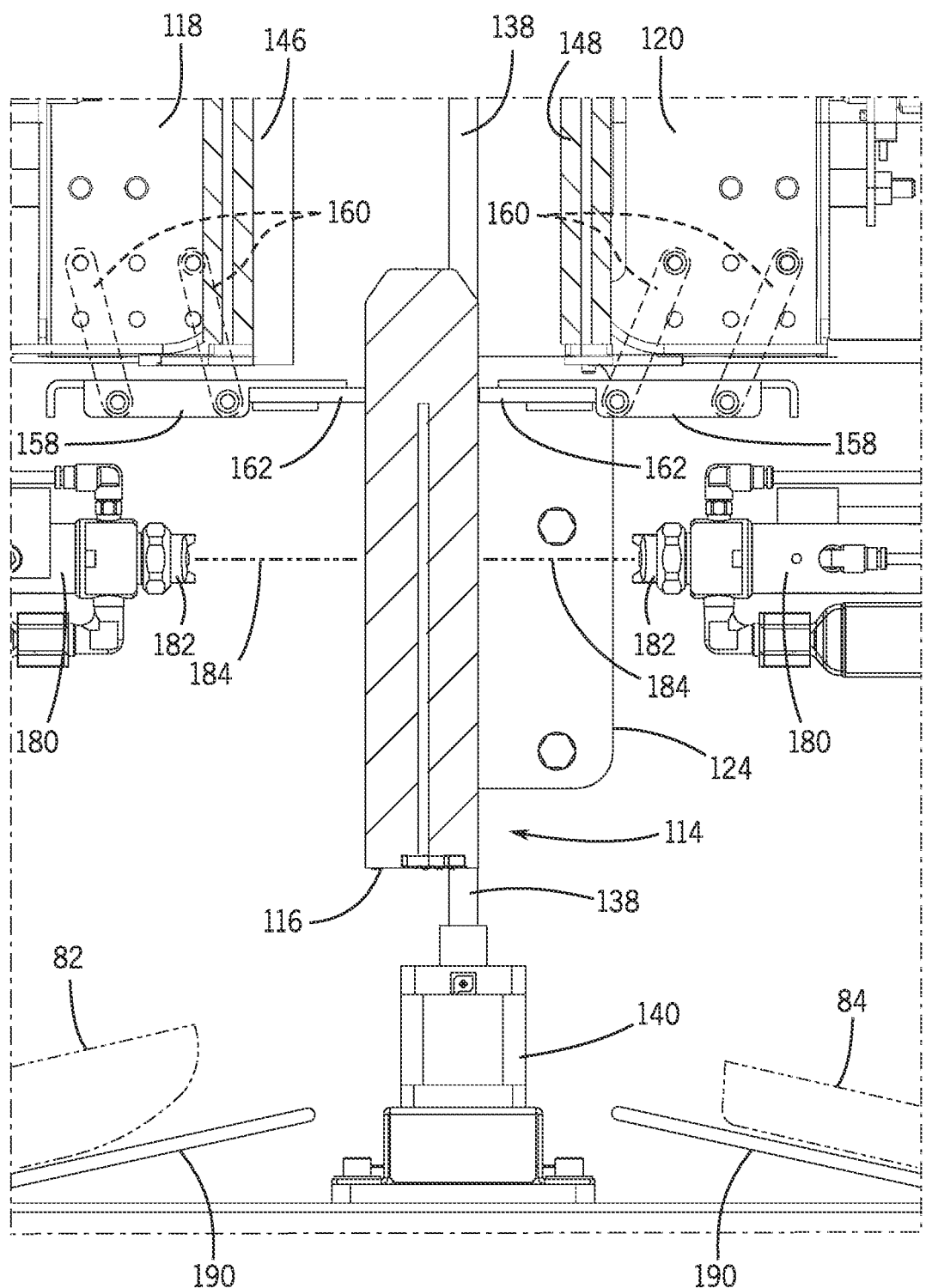
FIG. 10 is a front view of the contact toaster in another operational position.

Having described the structure of a contact toaster 100, embodiments of methods for use of the contact toaster 100 will now be discussed and in particular with reference to FIGS. 8-10. For example, embodiments of a contact toaster 100 can be used to simultaneously toast the crown section 82 and the heel section 84 of a bun. A user may first prepare a contact toaster 100 for use by interacting with the control interface 104. Through the input devices, the contact toaster 100 can receive adjustments to a variety of different settings, for example, based on at least one of a property of the food product to be toasted, the desired resulting toasted product, and any other factors. Such settings may include but are not limited to, the temperature of the toasting surfaces, the temperature of the compression plates, the compression force to be applied to a food product with the compression assembly 118 and/or the compression assembly 120, the time for which a food product is to be toasted, and any other variable or toasting parameter. Additionally or alternatively, a user may be able to select a food product to be toasted using the control interface 104, and a set of predetermined setting values corresponding to that food product may be automatically selected.

While the compression assemblies 118, 120 are in the idle positions and the platen assembly 114 in the toasting position, the crown section 82 can be inserted into the slot 172 and the heel section 84 can be inserted into the slot 174 through the feed opening 106 on the top side of the housing 102. Lateral movement of the crown section 82 and heel section 84 may be restricted by the side plates 124 of the platen assembly 114, and downward movement of the crown section 82 and heel section 84 out of the slots 172, 174 may be blocked by the gates 158 in their closed positions.

With the crown section 82 and heel section 84 received in the slots 172, 174, the compression assembly 118 and the compression assembly 120 can be moved into their extended positions to press the crown section 82 and heel section 84 against the heated toasting surfaces 126, 126 of the central platen 116. As the compression assembly 118 moves towards the platen assembly 114, the contact surface 152 of the compression plate 146 abuts the convex uncut side of the crown section 82, sliding the crown section 82 inward so that its concave cut side is pressed against the toasting surface 126 of the central platen 116. Similarly, as the compression assembly 120 moves inward, the contact surface 154 of the compression plate 148 abuts the uncut side of the heel section 84, sliding the heel section 84 inward so that its cut side is pressed against the toasting surface 128 of the central platen 116, as is shown in FIG. 8. To maintain their positions beneath the slots 172, 174, the gates 158 of the compression assemblies 118, 120 may be moved towards their open positions as the compression assemblies 118, 120 move inward. The compression assemblies 118, 120 may be configured to continue to move towards the central platen 116 as the force sensors monitor the compression force applied to the crown section 82 and heel section 84. When the compression force exerted on the crown section 82 or the heel section 84 reaches or exceeds a desired compression force threshold, inward movement of the corresponding one of the compression assemblies 118, 120 may be stopped. This may be useful, for example, in order to toast food products of different thicknesses without deforming the food product. The desired compression force can be a predetermined value, or it may be set by a user using the control interface 104. Additionally or alternatively, at least one of the compression assemblies 118, 120 can be configured to move a programmed distance towards the central platen 116, which may be based on the thickness of the food product to be toasted. In such an embodiment, the programmed distance can be a predetermined value, or it may be set by a user using the control interface 104.

With the compression assemblies 118, 120 in the extended positions, the crown section 82 and the heel section 84 can be held against the heated toasting surfaces 126, 128 until the crown section 82 and heel section 84 are toasted. The toasting time may be selected based on a predetermined toasting time, the temperature of the toasting surfaces 26, 128, the applied compression forces, the properties of the food product, the desired level of toasting, and any other factor. Once the crown section 82 and heel section 84 have been toasted, the compression assemblies 118, 120 can be moved outward away from the central platen 116, past their idle positions, and into the retracted positions, for example as shown in FIG. 9. The gates 158 may then be moved into their open positions to allow the toasted crown section 82 and heel section 84 to fall through the bottoms of the slots 172, 174 and the compression assemblies 118, 120 can be returned to their idle positions to await reception of additional food products. In some embodiments, the guide wires 130 positioned below the central platen 116 can may guide the falling crown section 82 and heel section 84 onto discharge slides 190 positioned below the slots 172, 174, and the discharge slides 190 can be configured to guide the crown section 82 and heel section 84 out of the housing 102 through the discharge openings 108.

In some embodiments, the contact toaster 100 may be configured to perform a self-cleaning process, which may be manually activated by the user via the control interface 104 and/or automatically activated after a predetermined number of food products have been toasted. When the cleaning process has been activated, the platen assembly 114 may be moved downward from the toasting position to the cleaning position, for example as shown in FIG. 10. As the platen assembly 114 moves downward, the wipers 162 connected to each of the gates 158 may make contact with the central platen 116 and wipe debris from the toasting surfaces 126, 128. Once the platen assembly 114 is in the cleaning position, the sprayers 180 may begin to discharge fluid from their nozzles 182 and the platen assembly 114 can begin to move back towards the toasting position. As the platen assembly 114 is moving upwards, fluid is sprayed onto the toasting surfaces 126, 128 below the wipers 162, which again make contact with the central platen 116 to wipe away any remaining debris and excess fluid.

In still further examples of the contact toaster 100, a camera (not depicted) is arranged relative to the discharge slides 190 and/or to the discharge opening 108. After the crown section 82 and heel section 84 of the bun have been toasted, the camera captures one or more images of the crown section 82 and/or the heel section 84. Computer analysis of the captures images can be used to evaluate the toasting/doneness of the food output from the toaster. Further details regarding such analysis can be found Applicant's co-pending U.S. Patent Application Publication Nos. 2019/0387926 and 2020/0288912, which are incorporated by reference herein in their entireties. The evaluation of the toasting/doneness can be used in a feedback loop to the toasting control relative to a user selection or input of the desired toasting level/doneness produced by the toaster. This feedback look can provide adjustment to toasting parameters including, but not limited to toast time, compression force, or plate temperature in response to this evaluation and comparison.

Many alternative configurations for a method of using a contact toaster will be recognized by one of ordinary skill in the art, and such configurations are intended to be within the scope of the present application.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives, and modifications are possible within the scope of the appended claims.

This written description uses examples to disclose the invention, including the best mode, and also to enable any person skilled in the art to make and use the invention. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A contact toaster for toasting a food product having a first food product portion and a second food product portion, the contact toaster comprising:
    a central platen arranged vertically within the contact toaster, the central platen including a first toasting surface and a second toasting surface generally opposite the first toasting surface, wherein the first toasting surface is convex and the second toasting surface is planar;
    a heating element configured to heat the first and second toasting surfaces;
    a first compression plate spaced apart from the first toasting surface to define a first slot between the first compression plate and the first toasting surface, wherein the first compression plate is concave and complementary to the first toasting surface;
    a second compression plate spaced apart from the second toasting surface to define a second slot between the second compression plate and the second toasting surface, wherein the second compression plate is planar;
    wherein the first compression plate and the second compression plate are selectively movable from respective first positions away from the central platen to respective second positions proximate to the central platen; and
    wherein the first toasting surface is shaped to conform to a surface of the first food product portion and the second toasting surface is shaped to conform to a surface of the second food product portion.

2. The contact toaster of claim 1, wherein the first compression plate and the second compression plate are linearly moveable between the first positions and the second positions.

3. The contact toaster of claim 2, further comprising:
    a first linear actuator connected to the first compression plate; and
    a second linear actuator connected to the second compression plate.

4. The contact toaster of claim 1, wherein the heating element is a central heating element, the first compression plate comprises first plate heating element, and the second compression plate comprises a second plate heating element.

5. The contact toaster of claim 1, further comprising guide wires connected to a lower end of the central platen, the guide wires configured to guide the first and second food product portions exiting the first and second slots through bottom ends thereof to a discharge slide leading to the discharge opening.

6. The contact toaster of claim 1, further comprising a first gate positioned below the first slot and a second gate positioned below the second slot; and
    wherein the first and second gates are selectively movable between closed positions in which a bottom end of the first and second slots are blocked and open positions in which the first and second food product portions can move through the bottom ends of the first and second slots.

7. The contact toaster of claim 6, wherein the first gate is connected to the first compression plate and the second gate is connected to the second compression plate.

8. The contact toaster of claim 1, further comprising at least one additional heating element configured to heat at least one of the first compression plate and the second compression plate.

9. A contact toaster for toasting a food product having a first food product portion and a second food product portion, the contact toaster comprising:
    a central platen arranged vertically within the contact toaster, the central platen including a first toasting surface and a second toasting surface generally opposite the first toasting surface, wherein the first toasting surface is contoured;
    a heating element configured to heat the first and second toasting surfaces;
    a first compression plate spaced apart from the first toasting surface to define a first slot between the first compression plate and the first toasting surface;
    a second compression plate spaced apart from the second toasting surface to define a second slot between the second compression plate and the second toasting surface;
    wherein the first compression plate and the second compression plate are selectively movable from respective first positions away from the central platen to respective second positions proximate to the central platen; and
    wherein the first toasting surface is shaped to conform to a surface of the first food product portion and the second toasting surface is shaped to conform to a surface of the second food product portion;
    wherein the central platen is selectively movable between a toasting position in which the central platen is positioned between the first and second compression plates and a cleaning position in which the central platen is out of alignment with the first and second compression plates; and
    wherein the contact toaster further comprises a first wiper and a second wiper respectively configured to wipe the first toasting surface and the second toasting surface as the central platen moves between the toasting position and the cleaning position.

10. The contact toaster of claim 9, further comprising a first gate and a second gate movable between open positions and closed positions to selectively retain the first and second food product portions if the first and second slots; and
    wherein the first wiper is secured to the first gate and the second wiper is secured to the second gate and the central platen is selectively movable past the first and second wiper, wherein the first wiper is configured to engage the first toasting surface and the second wiper is configured to engage the second toasting surface as the central platen moves past the first and second wiper.

11. The contact toaster of claim 9, further comprising at least one nozzle configured to spray a liquid onto the first and second toasting surfaces as the central platen moves between the toasting position and the cleaning position; and
    wherein the liquid is at least one of water, oil, a cleaning solution, and a flavor enhancer.

12. A contact toaster for toasting a food product having a first food product portion and a second food product portion, the contact toaster comprising:
- a central platen arranged vertically within the contact toaster, the central platen including a first toasting surface and a second toasting surface generally opposite the first toasting surface, wherein the first toasting surface is contoured;
- a central heating element configured to heat the first and second toasting surfaces;
- a first compression plate spaced apart from the first toasting surface to define a first slot between the first compression plate and the first toasting surface, the first compression plate comprising a first plate heating element;
- a second compression plate spaced apart from the second toasting surface to define a second slot between the second compression plate and the second toasting surface, the second compression plate comprising a second plate heating element;
- wherein the first compression plate and the second compression plate are selectively movable from respective first positions away from the central platen to respective second positions proximate to the central platen; and
- wherein the first toasting surface is shaped to conform to a surface of the first food product portion and the second toasting surface is shaped to conform to a surface of the second food product portion.

13. The contact toaster of claim 12, wherein the first compression plate and the second compression plate are linearly moveable between the first positions and the second positions.

14. The contact toaster of claim 13, further comprising:
- a first linear actuator connected to the first compression plate; and
- a second linear actuator connected to the second compression plate.

15. The contact toaster of claim 12, wherein the first toasting surface is convex and the first compression plate is concave.

* * * * *